US006868178B1

(12) United States Patent
Frei et al.

(10) Patent No.: US 6,868,178 B1
(45) Date of Patent: Mar. 15, 2005

(54) METHOD FOR PROCESSING IMAGE DATA

(75) Inventors: Bernhard Frei, Constance (DE); Markus Schnitzlein, Radolfzell (DE)

(73) Assignee: CGK Computer Gesellschaft Konstanz mbH, Constance (DE)

( * ) Notice: Subject to any disclaimer, the term of this patent is extended or adjusted under 35 U.S.C. 154(b) by 0 days.

(21) Appl. No.: 09/720,564

(22) PCT Filed: Jun. 25, 1999

(86) PCT No.: PCT/DE99/01855

§ 371 (c)(1),
(2), (4) Date: Dec. 21, 2000

(87) PCT Pub. No.: WO99/67744

PCT Pub. Date: Dec. 29, 1999

(30) Foreign Application Priority Data

Jun. 25, 1998 (DE) .......................... 198 28 396

(51) Int. Cl.[7] ................................................. G06K 9/00
(52) U.S. Cl. ..................... 382/162; 382/173; 706/52
(58) Field of Search ................................. 382/162, 173, 382/199, 260, 261, 264, 275, 317; 358/505, 448, 406; 706/52

(56) References Cited

U.S. PATENT DOCUMENTS 5,664,031 A 9/1997 Murai et al.
5,778,156 A * 7/1998 Schweid et al. .............. 706/52

FOREIGN PATENT DOCUMENTS

EP 0 632 402 1/1995
WO WO 92/01999 2/1992

OTHER PUBLICATIONS

Carron, T. et al., "Fuzzy Color Edge Extraction by Inference Rules Quantitative Study and Evaluation of Performances", Proceedings of the International Conference on Image Processing, (1995) pp. 181–184.

Chi, Zheru et al., "Image Segmentation Using Fuzzy Rules Derived from K–Means Clusters", Journal of Electronic Imaging, vol. 4, No. 2, (1995), pp. 199–206.

"Character Preprocessing and Filtering for Convenience Amount Recognition", IBM Technical Disclosure Bulletin, vol. 34, No. 4B, (1991), pp. 326–329.

Kropatsch, Walter G., "Mustererkennung 1994 Erkennen und Lernen" 16. DAGM Symposium und 18. Workshop de ÖAGM, pp. 624–633.

* cited by examiner

Primary Examiner—Timothy M. Johnson
Assistant Examiner—Ali Bayat
(74) Attorney, Agent, or Firm—Schiff Hardin LLP

(57) ABSTRACT

In a method for processing image data, at least one section of a form (10) is raster scanned and converted into a digital image with image points (22, 24, 26), the color of each image point (22, 24, 26) being represented as tone H, saturation S, and brightness B. Using fuzzy technology, the membership of the image points (22, 24, 26) ant their colors in color categories (UB, SF, BF) is determined by way of membership functions and a gray value GW is allocated to each image point (22, 24, 26) depending on the thus determined color category (UB, SF, BF).

14 Claims, 7 Drawing Sheets

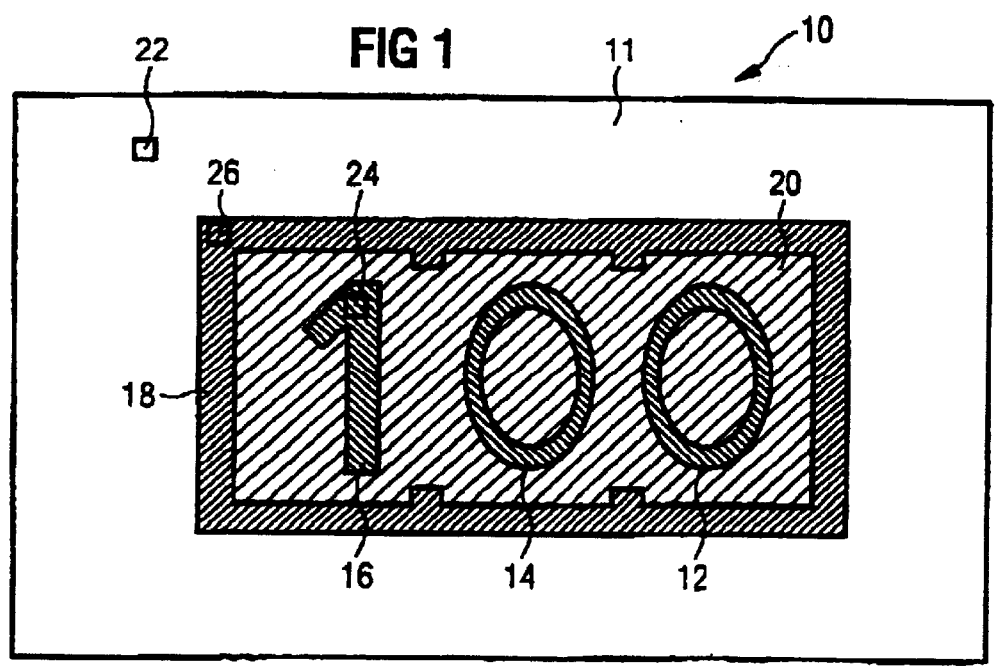
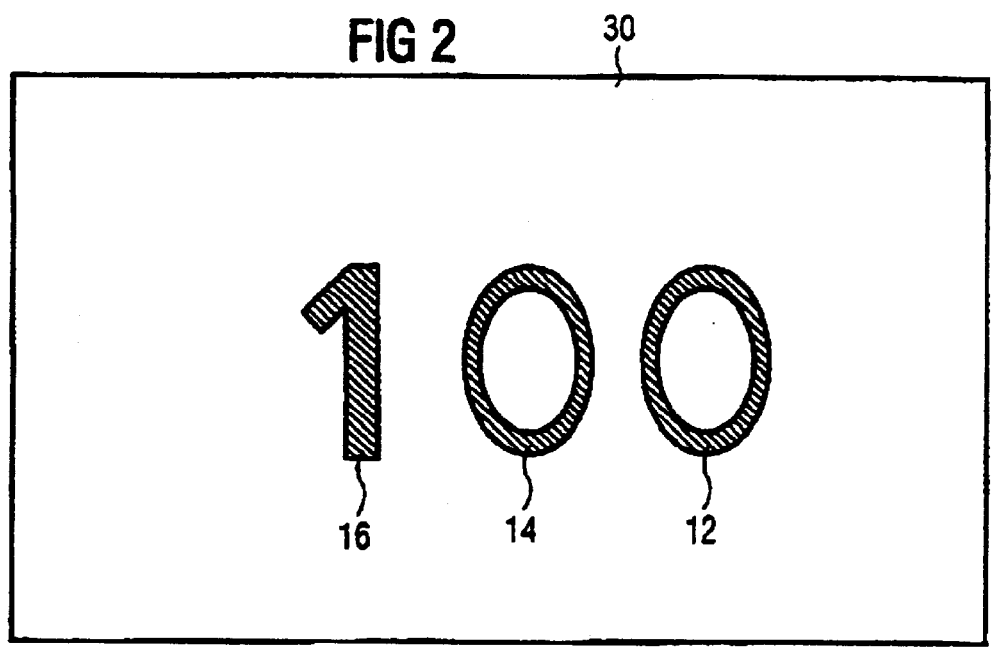

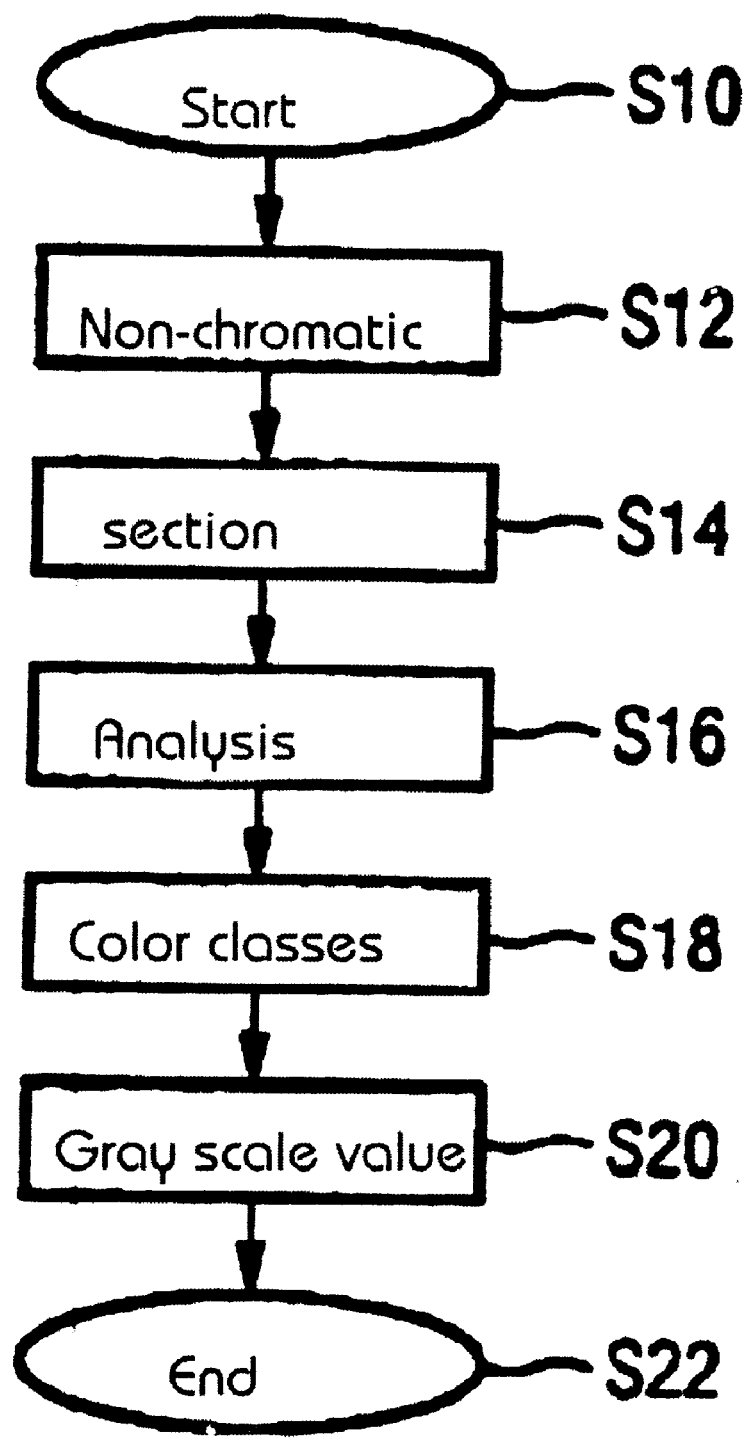

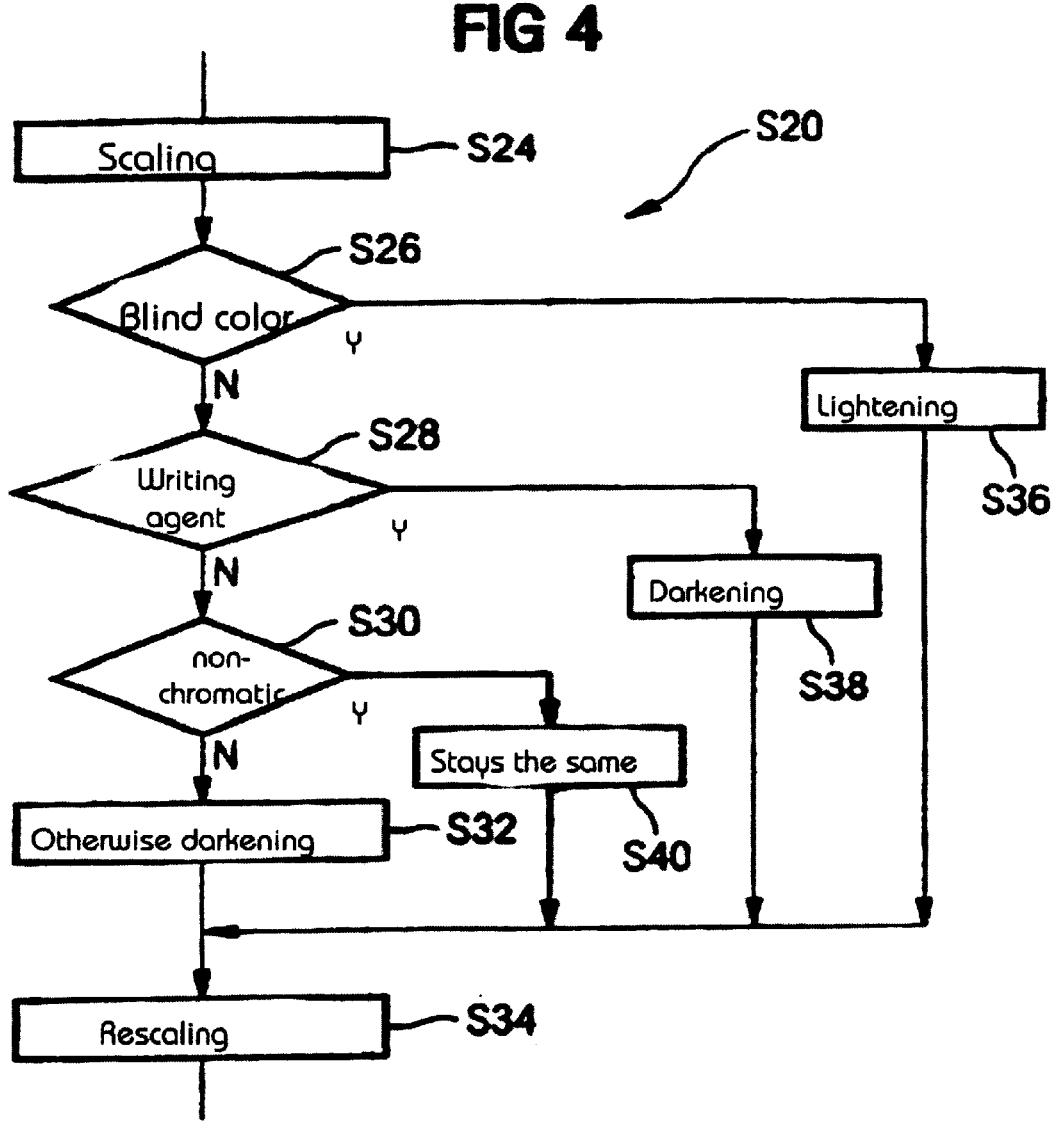

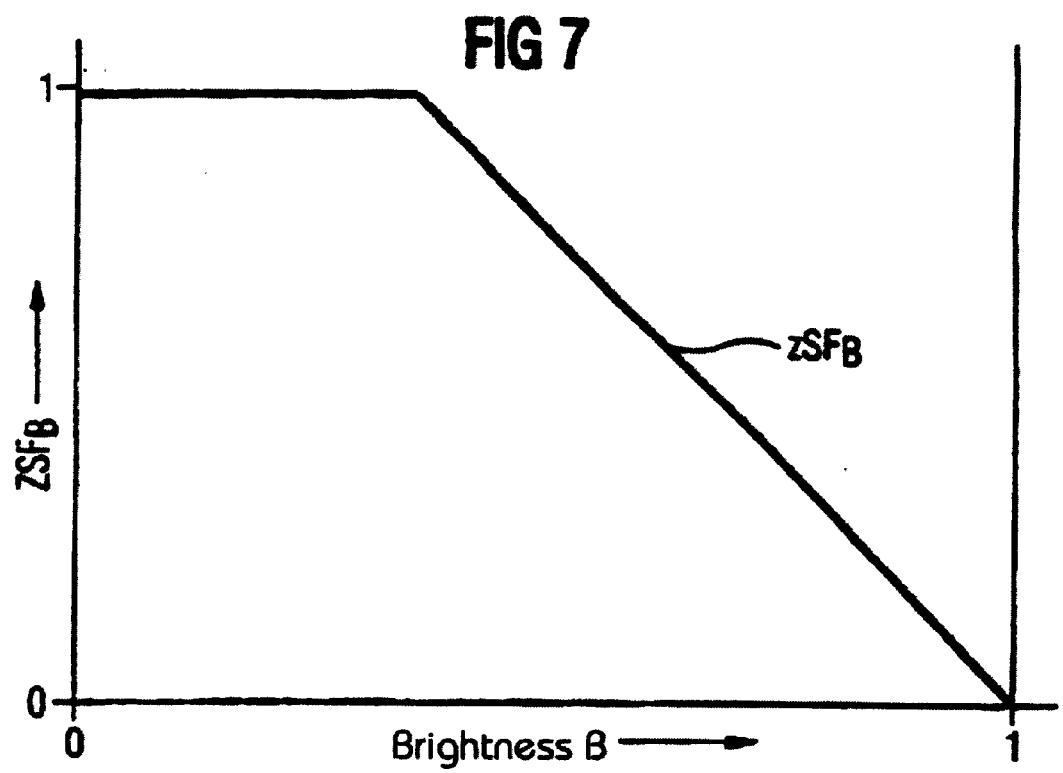
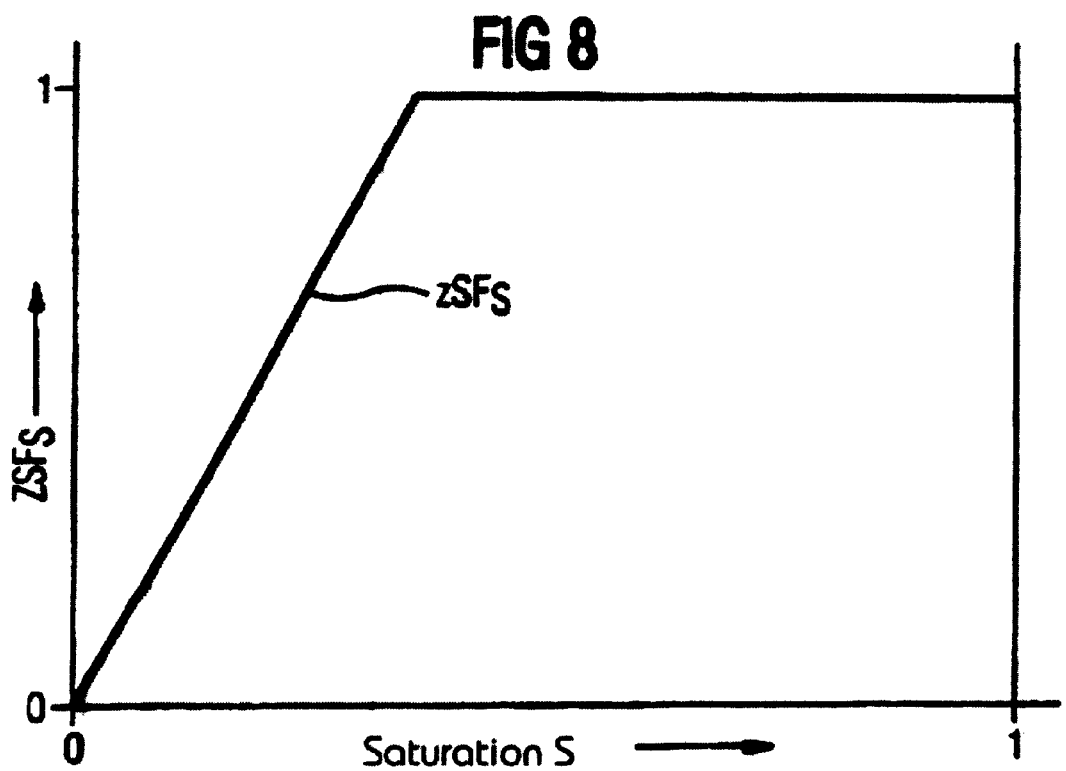

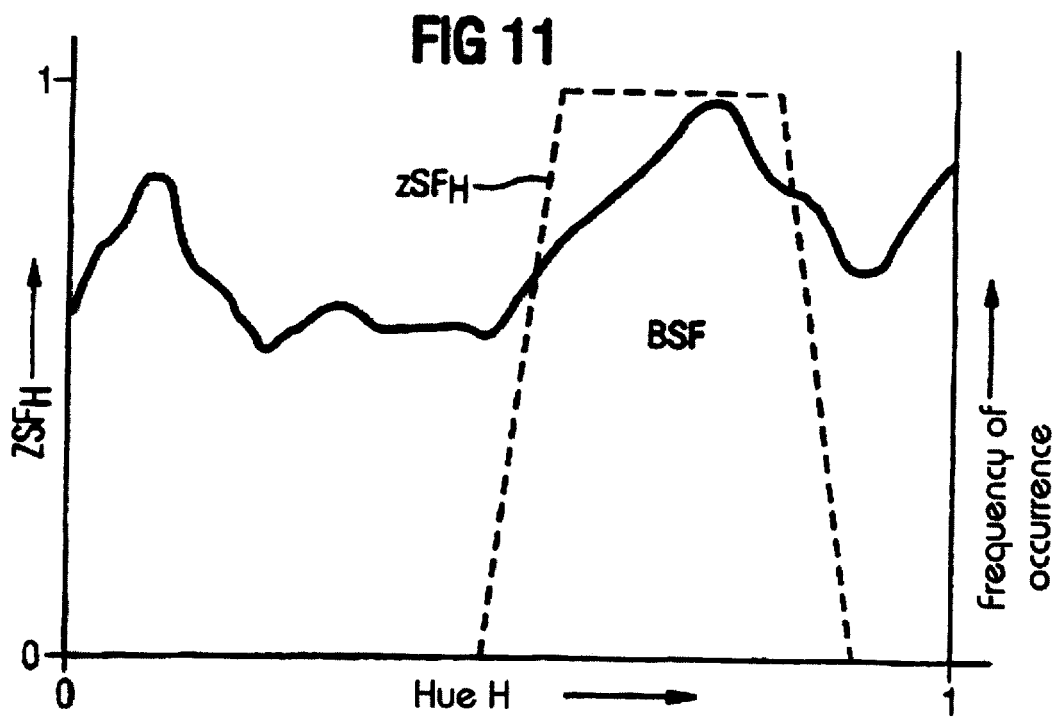
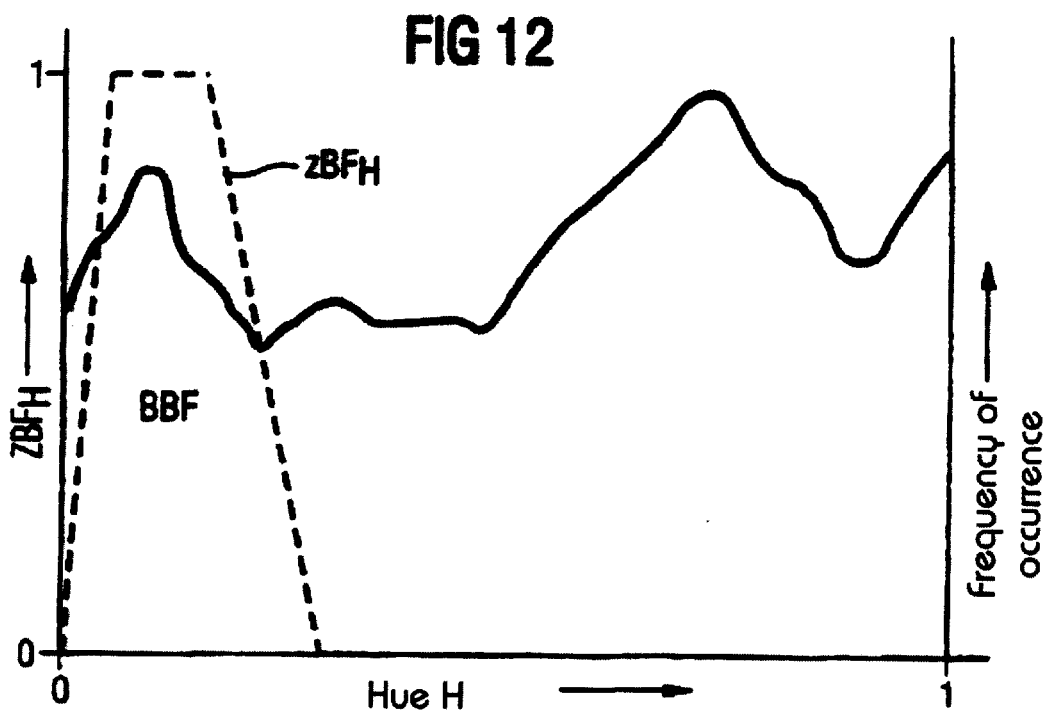

METHOD FOR PROCESSING IMAGE DATA

BACKGROUND OF THE INVENTION

1. Field of the Invention

The invention is directed to a method for processing image data, in which at least one section of a form is scanned in a raster-like manner and converted into a digital image with picture elements. The color of each and every picture element is presented according to the HSB color presentation as hue H, saturation S and brightness B, and a gray scale value GW is allocated to the respective picture element. This type of method can be utilized everywhere that great quantities of forms are read in a raster-like format and the information contained in them are edited with optical character recognition for further electronic data processing. Forms generally have structuring aids, also called scatter information, that ensure that the information fetched by a user ("payload information") are ordered in a specific way and applied on the form in a uniform fashion. It is necessary for dependable and fast text recognition to separate the scatter information from the payload information.

2. Description of the Related Art

In automatic document processing applications, for example, colors are selected for the scatter information that can be easily filtered out by optical filters. What is disadvantageous about the method is that only a few interconnected wavelength regions of the light can thus be filtered out.

Another known method is digital color filtering of the colors of the picture elements of a form read in raster-like. Many wavelength regions of the light, even those that are non-interconnected, can thus be filtered out. What is disadvantageous about this digital filtering process is that, fundamentally, the property of scatter or payload information must be assigned to every color occurring on the form so that a decision can be made as to whether a picture element having such a color carries payload or scatter information. Due to fluctuations in the illumination of the forms during read-in, however, color modifications occur and mixtures that often no longer allow an unambiguous allocation of the picture elements also occur within a form due to neighboring picture elements having different colors.

The document, Carron et al., "Fuzzy Color Edge Extraction by Inference Rules: Quantitative Study and Evaluation of Performance," Proceedings of the International Conference on Image Processing (ICIP), US, Los Alamitos, IEEE Comp. Soc. Press, October 1995 (1995-10), pages 181–184, XP000623941 ISBN: 0-7803-3122-2, is viewed as the most relevant Prior Art with respect to the present invention. It discloses a method for processing image data, in which the color of each and every picture element is presented in the HSI color space.

According to a fuzzy technique, the membership of the pixels in the edge class is determined with color differences from the neighboring picture elements from different membership functions. The degree of the membership in the edge class is determined by a combined minimum and maximum formation.

U.S. Pat. No. 5,778,156 discloses a method for processing image data in which at least a section of a form is scanned raster-like and converted into a digital image with picture elements, by which the color of each and every picture element is presented. The memberships of the color of each and every picture element in three image classes is determined from different membership functions according to a fuzzy technique, and the respective picture element is further processed depending on the identified memberships.

SUMMARY OF THE INVENTION

An object of the invention is to develop an optimally simple, application-related segmentation method based on a fuzzy technique.

This object is inventively achieved by a method for processing image data, comprising the steps of scanning at least one section of a form raster-like; converting the scanned form into a digital image comprising picture elements, a color of each and every picture element being presented according to the HSB color presentation at hue H, saturation S and brightness B; determining, from a membership function $zUB_B$ via the brightness or from a membership $zUB_S$ via the saturation, in conformity with a fuzzy technique, memberships $ZUB_B$ and $ZUB_S$ of the color of each and every picture element in a first color class UB; determining, from a membership function $zSB_B$ via the brightness B, a membership function $zSF_S$ via the saturation S, or from a membership function $zSF_H$ via the hue H, memberships $ZSF_B$, $ZSF_S$ and $ZSF_H$ of the color of each and every picture element in a second color class SF; determining, from a membership function $zBF_B$ via the brightness B, a membership function $zBF_S$ via the saturation S, or from a membership function $zBF_H$ via the hue H, memberships $ZBF_B$, $ZBF_S$ an $ZBF_H$ of the color of each and every picture element in at least one third color class BF; determining minimum values UBMIN=($ZUB_B$, $ZUB_S$), SFMIN=($ZSF_B$, $ZSF_S$, $ZSF_H$), and BFMIN=($ZBF_B$, $ZBF_S$, $ZBF_H$) of the memberships $ZUB_B$, $ZUB_S$, $ZSF_B$, $ZSF_S$, $ZSF_H$, $ZBF_B$, $ZBF_S$, $ZBF_H$ in respective color classes UB, SF, BF; determining a maximum value M among the minimum values UBMIN, SFMIN, BFMIN; allocating a respective color as well as picture elements belonging to this color to a color class UB, SF, BF that belongs to the maximum value M; and allocating, depending on identified the color class UB, SF, BF, a gray scale value GW to a respective picture element.

Advantageous developments include the method further comprising the steps of converting the value of the brightness B of a picture element into a scaled brightness Y with a value range 0 through 1; and defining the gray scale value GW depending on the scaled brightness Y. The scaled brightness Y may be allocated to the respective picture element as a gray scale value GW when the maximum value M belongs to the first color class UB. The gray scale value GW is allocated to the picture element according to the relationship GW=MIN (Y, 1-SFMIN) when the maximum value M belongs to the second color class SF. The gray scale value may be allocated to the picture element according to the relationship GW=MAX (Y, BFMIN) when the maximum value M belongs to the third color class BF.

An advantageous development of the invention may include determining a value L for each picture element according to the relationship L=MAX(UBMIN, SFMIN, BFMIN); and forming a value SOMIN according to the relationship SOMIN=1=L where SOMIN is the membership of the picture element in a fourth color class SO. One may allocate a minimum value from the scaled brightness Y and a value 1-SOMIN may be allocated to a respective picture element of the fourth color class SO as a gray scale value GW according to the relationship GW=MIN(Y, 1-SOMIN).

The membership function $zUB_B$ or $zUB_S$ for brightness value B or, respectively, saturation values S between a minimum value UBB1 and a maximum value UBB2 may have the value 0. These membership functions $zUB_B$ or $zUB_S$ for low brightness values B and high brightness values B or, respectively, for low saturation values S and high saturation values S, may have a rectangular, triangular, trapezoidal or an S-shaped curve in the fashion of a half-bell curve. A frequency of occurrence may be provided with which picture elements with specific hues H occur in at least one section of the form in the form of a frequency distribution over the hue H, the membership functions $zSF_H$, $zBF_H$ in regions with hues H from this frequency distribution having a rectangular, triangular, trapezoidal or an S-shaped curve in the fashion of a half-bell or a whole bell curve. The membership functions $zSF_B$, $zSF_S$, $zBF_B$, $zBF_S$ may have a rectangular, triangular, trapezoidal or an S-shaped curve in the fashion of a half-bell or a whole-bell curve. Colors with which payload information are applied on the form may be mainly allocated to the second color class SF. Colors F with which scatter information are applied on the form may be mainly allocated to the third color class BF. The fourth color class SO may have colors F allocated to it that do not belong to any other color class UB, BF, SF.

The method offers the advantage that a presentation of the colors of the picture elements in the HSB color model allows membership functions to be defined in a simple way dependent on color components according to a fuzzy technique and to be utilized in a similar way. The employment of fuzzy techniques makes it possible to automatically implement a majority of the allocation of the property scatter information or payload information to the colors of the individual picture elements. The picture elements and their colors are thereby allocated to color classes.

It is advantageous to employ at least three color classes since the decision about payload information or scattered information is not always unambiguously possible, and this decision in this situation is avoided by a suitable selection of at least one additional color class. These three color classes are UB, SF and BF, where the color class UB has mainly non-chromatic colors allocated to it and the color class SF has the colors of the writing with which the payload information are written allocated to it. The color class BF has mainly blind colors allocated to it with which the scatter information are printed on the form.

In one exemplary embodiment, the value of the brightness B of a picture element is converted into a scaled brightness Y with the value range 0 through 1, and the gray scale value GW is defined dependent on the scaled brightness Y. Since the memberships are also defined in this value range, the scaled brightness Y can be compared to the maximum value M for defining the gray scale value GW. This results in an enhanced separation.

In a further exemplary embodiment, the scaled brightness Y is allocated to the respective picture element as gray scale value GW when the maximum value M belongs to the first color class. Picture elements have "non-chromatic" colors, such as gray, and also the hue H assigned to them in the presentation of the color in the HSB model. Known digital filter methods often assign an incorrect color to picture elements having such colors which leads to a loss of information or to a reduction of the contrast. These problems can be solved by the aforementioned allocation of a gray scale value GW to picture elements having colors of the first color class. These embodiments are explained in more detail below.

In one of these exemplary embodiments, a picture value has the gray scale value GW allocated to it according to the relationship $$GW = \text{MIN}(Y, 1-SF\text{MIN})$$

when the maximum value M belongs to the second color class. This has the advantage that picture elements having colors that belong to the second color class, which are mainly payload information, are presented in a dark gray hue, resulting in an enhancement of contrast.

One version provides that a picture element has the gray scale value GW allocated to it according to the relationship $$GW = \text{MAX}(Y, BF\text{MIN}),$$

when the maximum value M belongs to the third color class. Picture elements having colors of the third color class, i.e., mainly scatter information, are then presented brightened.

In a further exemplary embodiment, a value L according to the relationship $$L = \text{MAX}(UB\text{MIN}, SF\text{MIN}, BF\text{MIN})$$

is formed for each picture element, the value SOMIN is then formed according to the relationship $$SO\text{MIN} = 1-L$$

where SOMIN is the membership of the picture element to a fourth color class. As a result of this fourth color class, picture elements that do not unambiguously belong to one of the other color classes can be separately processed, which results in the method being employed in a versatile fashion.

When, in an exemplary embodiment, the minimum value from the scale brightness Y and the value 1-SOMIN is allocated as gray scale value GW to a picture element of the fourth color class according to the relationship $$GR = \text{MIN}(Y, 1-SO\text{MIN})$$

then the writing can be intensified for forms having extremely thin writing, in that the picture elements of the fourth color class are darkened.

An exemplary embodiment is also possible in which picture elements of the fourth color group are brightened for forms having a great quantity of scatter information, and are brightened for further contrast enhancement.

In a development of the invention, the frequency of occurrence with which the picture elements having specific hues H occur in at least one section of the form is presented in the form of a frequency distribution over the hue H, and the membership functions $zSF_H$, $zBG_H$ have a rectangular, triangular, trapezoidal or S-shaped curve in regions with hues from this frequency distribution in the fashion of a half-bell curve or a whole bell curve. The presentation of the frequency distribution facilitates the selection of regions of hues that belong to the scatter or payload information. It is advantageous to define the frequency distribution only from one section of the form when large parts of the form contain no scatter or payload information; in this way, information about the hues H employed is thus obtained without noteworthy disturbing influences. Moreover, the processing time can be shortened when the frequency distribution from only one section of the form is determined.

BRIEF DESCRIPTION OF THE DRAWINGS

An exemplary embodiment of the invention in which a colored original acquired point-by-point is converted into a high-contrast gray scale image is explained in greater detail below with reference to the drawing.

FIG. 1 is a section of a form having payload and scatter information;

FIG. 2 is an edited section of the form having emphasized payload information;

FIG. 3 is a flowchart showing an executive sequence for defining color classes and for allocation of a gray scale value;

FIG. 4 is a flowchart for a group of method steps for allocating a gray scale value;

FIG. 7 is a graph of a membership function for the color class SF dependent on the brightness;

FIG. 8 is a graph of the membership in the color class SF dependent on the saturation;

FIG. 11 is a graph of a frequency distribution of the picture elements having identical hues as well as a membership function for assigning hues to the color class SF; and FIG. 12 is a graph of the distribution of the frequency of occurrence of the picture elements that have identical hues, as well as the membership in the color class BF as a function of the hue.

DESCRIPTION OF THE PREFERRED EMBODIMENTS

Figure 5:
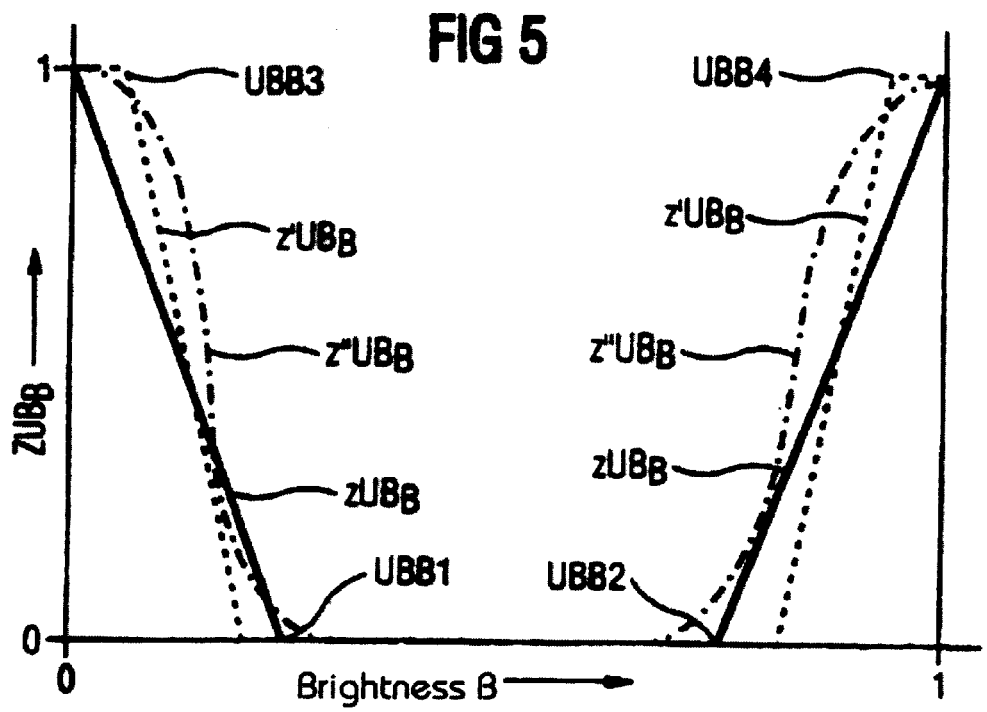
FIG. 5 is a graph of the membership in the color class UB as a function of the brightness.

In automated document processing, forms are scanned raster-like in an OCR unit (optical character recognition) and the electrical signals belonging to individual picture elements are stored as digital values. The color information contained in these picture elements is interpreted with an image pattern processing, for example, with the assistance of text recognition routines. A form is distinguished in that the information to be fetched by a user are interrogated in a structured form. For example, a character spacing and an approximate script size can be prescribed by boxes. The boxes often have a colored underlay so that they clearly contrast with the background. Additionally, such a form can contain further-reaching explanations in a specific coloration. The explanations and the structuring aids are referred to as scatter information; the information fetched by the user are referred to as payload information.

FIG. 1 shows a section of a form 10, the section containing a background 11, payload information 12, 14, 16 and scatter information 18, 20. The payload information 12, 14, 16 are presented here as numbers; a subdivided box 18 is entered shaded as scatter information 18, 20, this having an underlay of a colored surface 20. In document processing, as previously mentioned, this form 10 is read by an OCR unit in the form of individual picture elements, and is read according to a predetermined raster upon involvement of the color information. Three such picture elements 22, 24, 26 are entered by way of example in FIG. 1.

It is known from colorimetry that a color F can be completely and unambiguously described by three dimensional figures. An RGB color presentation is usually employed in computer-assisted read-in and processing of the color F, where a color F is generated by additive mixing of the primary colors red, green, blue. R, G, B are trichromatic colorimetric measures (called color values, R, G, B below) that indicate amounts with which the primary colors red, green, blue participate in the mixing of the color F, according to the relationship:

$$F=R+G+B=(R,G,B).$$

The primary colors red, green, and blue are defined by international agreement, in which red has the wavelength 700 nm, green has the wavelength 546.1 nm and blue has the wavelength 435.8 nm.

The individual color values R,G,B assume only discrete values in computer-assisted processing. Digital values having a length of 8 bits, for example, are standard, where the color F of an individual picture element is presented with the three color values R,G,B as value having a length of 24 bits.

The OCR unit should recognize the payload information 12, 14, 16 and forward them to following units. The recognition of the payload information 12, 14, 16 on the form 10 is comparatively simple for the human eye, upon which the scatter information 18, 20 represent only a slight disturbance. In order for the OCR unit to recognize the payload information 12, 14, 16, the scatter information 18, 20 must be largely suppressed by a suitable filtering process.

FIG. 2 shows an illustration of the form 10 according to FIG. 1 with ideal filtering. The picture elements that carry payload information 12, 14, 16 are shown shaded and have a high black part; they contrast from the background 30 with high contrast. The picture elements that carry scatter information are shown as white and do not contrast with the background 30. This ideal presentation can only be achieved in very few instances. However, a presentation with adequate separation in which the payload information 12, 14, 16 can be clearly recognized and the scatter information 18, 20 do not differ from the background 30 or differ only slightly from it is required at least for character recognition.

Usually, colors F are employed for the scatter information 18, 20 of such a form 10 that can be easily separated from the colors F of the payload information 12, 14, 16 with optical or digital filtering methods. Such a filtering method becomes difficult when a plurality of non-interconnected colors F are employed for the scatter information 18, 20 or when the background 11 of the form 10 is chromatically designed. The payload information 12, 14, 16 can then often not be separated from the scatter information 18, 20 and from the background 11 with adequate separation for the following text recognition.

For known digital filtering methods, it is necessary in this case to allocate a property to each color F that characterizes whether a picture element with this color F carries scatter information 18, 20 or payload information 12, 14, 16. A gray scale value GW can also be allocated to each picture element according to its color F. Gray refers to non-chromatic colors whose saturation S is equal to 0. The saturation S is a criterion for the spectral purity. The saturation S is defined as:

$$S=1-(3\ MIN(R,G,B)/(R+G+B)).$$

where MIN (R,G,B) references the lowest value of R, G, B. A color is evaluated as gray when all three color values R,G,B are the same. One colorimetric measure, the gray scale value GW $$GW=R=G=B$$

then suffices for such a characterization. The gray scale value GW reflects a gray color with different brightnesses.

The color black has the gray scale value GW=0 and white has the gray scale value GW=255, these values representing a binary value expressed in decimal notation. When a chromatically acquired form 10 is converted into a gray scale image, a data reduction from an original 24 bits to 8 bits per picture element ensues, since only a single characteristic quantity, the gray scale GW, suffices in this situation instead of the three independent color values R,G,B. Text recognition routines are often in the position to extract payload information 12, 14, 16 from a gray scale image produced in this way.

When picture elements of the form 10 already carry such non-chromatic colors F, i.e., for example, picture elements 22 of the background 11 being white or picture elements 24 with payload information 12, 14, 16 being black, then, due to non-uniform illumination or incorrect adjustment of the OCR unit, non-chromatic colors F of such picture elements 22, 24, 26 may not be correctly recognized and are further-processed as colors F having low saturation S. When, for example, the picture elements 24 with payload information 12, 14, 16 are black and the picture elements 26 with scatter information 18, 20 are read, the black color F of a picture element 24 may be recognized as a dark red color F with low saturation S. When, by applying a traditional digital filtering method, the color red is now replaced by the color white so that the picture elements having scatter information 18, 20 become invisible for the text recognition, then the picture element 24 is also given the color white and the payload information 12, 14, 16 is lost.

Another example assumes that the picture elements 24 having payload information 12, 14, 16 are blue. When the white color F of the picture element 22 is recognized during read-in as a light blue color F having low saturation S, then a traditional digital filtering method can lead to the fact that a black color is assigned to the picture element 22 and the separation decreases.

A method is disclosed below in which a chromatically red form 10 is converted into a gray scale image having high separation, where the picture elements 24 with payload information 12, 14, 16 can be clearly recognized and the picture elements 26 of the scatter information 18, 20 differ only slightly from the picture elements 22 of the background.

The method utilizes the graphic HSB color model (hue, saturation, brightness). Due to the presentation of the colors in this HSB color model, the saturation S and the brightness B of a color can be additionally taken into consideration in the allocation of a gray scale value in addition to the hue H. The presentation of the colors can be converted from the RGB color model in to the HSB color model. The hue H is defined as:

$$H = \arccos(((R-G)+(R-B))/2\ SQRT((R-G)^2+(R-B)(G-B))).$$

SQRT is the square root of the argument of SQRT. H in this presentation extends from 0□ through 360□ and is a criterion for the wavelength. Red, for example, corresponds to H=0□ and blue corresponds to H=240□.

The saturation S has been defined above and extends from 0 through 100%. The color F is all the more intense and luminous the higher the saturation S is. The following applies for the brightness B:

$$B=(R+G+B)/3.$$

The brightness is likewise described as a percent and refers to the black part. 0% stands for the maximum black and 100% stands for the minimum (0) black part. Pure blue in the HSB color model has the characteristic quantities H=240□, S=100% and B=100%.

FIG. 3 shows an executive sequence for the definition of color classes and for assigning a gray scale value GW to the picture elements of the form 10 read in point-by-point depending on the color F and the membership of the color F in the color classes. The membership of a color F in one of the color classes is defined upon employment of a fuzzy description, i.e., the membership can assume not only binary values "0" and "1" in the sense of "non-member" or "member", it is also defined via a membership function that can assume values between 0 and 1 depending on a variable, where a 0 denotes the lowest and a 1 denotes the highest membership in the respective color class.

The executive sequence is started in method step S10. A "non-chromatic", first color class UB is then defined in Step S12. Limits for the brightness B and the saturation S are defined for the color class UB, as explained in greater detail below. A color F has a high membership in the color class UB when the brightness B or the saturation S lie outside of these limits.

In Step S14, the user can select a region of the form 10 to be analyzed. This is always meaningful when scatter or payload information are present at only a few locations on the form 10. A region is then selected for the following method steps in which predominantly scatter or payload information are applied on the form 10.

A frequency analysis of the picture elements according to hues H in the previously selected region or, potentially, in the entire form 10 ensues in Step S16. In this analysis, only picture elements having hues H of the colors F are taken into consideration whose membership $ZUB_B$, $ZUB_S$ in the color class UB is dependent on the brightness B or on the saturation S less than 0.5. The plurality is determined for the remaining picture elements that have the same value for the hue H within predetermined limits. For example, an analysis ensues according to a maximum of 65536 hues H. The result of the analysis is graphically presented to the user as a histogram for further processing. This histogram indicates the frequency with which picture elements having the same hue H occur. An example of such a histogram is provided below. The frequency of occurrence analysis can be foregone when the colors F that occur on the form 10 and, thus, the occurring hues H are known.

In the Step S18, the picture elements having colors F are assigned memberships in three further color classes, namely memberships in the color class BF (blind color), in the color class SF (script color) and in the color class SO (other) in addition to the non-chromatic color class UB that has already been discussed. The memberships $ZBF_B$, $ZBF_S$ of a picture element and its color F in a color class BF (blind color) is determined on the basis of two membership functions $zBF_B$, $zBF_S$ dependent on the brightness B and on the saturation S. Moreover, at least one region BBF of hues in which the membership $ZBF_H$ of the picture elements that have the hues H is defined in the color class BF with the assistance of a membership function $zBF_H$ and is selected in the frequency distribution of the hues H determined in the Step S16. Examples of one or more such membership functions $zBF_H$ are presented below. High membership $ZBF_B$, $ZBF_S$. $ZBF_H$ in the color class BF are assigned to those picture elements that have colors F in which the scatter information 18, 20 is applied on the form 10.

The procedures is similar for the picture elements and their colors for the allocation to the color class SF (average script color). High memberships in the color class SF are assigned to the picture elements having the colors F that carry the payload information 12, 14, 16 in the color of the writing agent employed. Here, too, membership functions $zSF_B$, $zSF_S$, for the membership $ZSF_B$, $ZSF_S$ in the color class SF are defined dependent on the brightness B and on the saturation S, and at least one region BSF of hues H is also selected from the frequency distribution according to Step S16. Picture elements having a hue H within the region BSF have memberships $ZSF_H$ in the color class SF allocated to them dependent on this hue H via a membership function $zSF_H$. Examples of the membership functions $zSF_B$, $zSF_S$, $zSF_H$ are provided below.

Picture elements having colors F that belong to none of the other color classes UB, BF, SF are assigned to the fourth color class SO. The type of allocation is explained below. This color class SO provides the user with a further possibility of intervening in the filtering process. When the payload information 12, 14, 18 of the forms, for example, are applied with extremely thin pencil strokes, it is particularly important that no payload information be lost. Picture elements having colors of the color class SO are then darkened. When the scatter information 18, 20 predominate on the form, in contrast, it is more important to eliminate the scatter information and to thus achieve a contrast enhancement. Picture elements having colors of the color class SO can be additionally attenuated in this case by brightening.

In method step S20, a minimum value UBMIN, SFMIN, BFMIN, SOMIN of the memberships in each of the color classes UB, SF, BF, SO is defined for each picture element and its color F. The maximum value M among these minimum values UBMIN, SFMIN, BFMIN, SOMIN is defined. The color F is then allocated to the color class SF, BF, UB, SO to which the maximum value belongs. Examples of this are explained below.

A gray scale value GW is allocated to the color F dependent on its color class SF, BF, UB, SO and its brightness B. This means that every picture element having this color F subsequently has this gray scale value GW. The exact type of gray scale value allocation is discussed in greater detail below. The executive sequence is ended in Step S22.

FIG. 4 shows the individual steps of the group of method steps S20 from FIG. 3. In Step S24, the value of the brightness B for each color F is divided by the maximum value BMAX of the brightness, so that the scaled values Y for the brightness B lie between 0 and 1, where the value 1 stands for the greatest brightness B and the value 0 stands for the lowest brightness B.

Subsequently, a determination is made for each color F regarding which of the four color classes BF, SF, UB, SO it is assigned to. A minimum value BFMIN of the memberships in the color class BF is defined. BFMIN is the lowest value of the memberships $ZBF_H$, $ZBF_B$, $ZBF_S$ in the color class BF dependent on the hue H, the brightness B and the saturation S. When a plurality of regions BBF of hues H have been assigned to the color class BF in the step S18, then the minimum value of the memberships $ZBF_H$, $ZBF_B$, $ZBF_S$ is individually defined for each region BBF. The highest of these values is employed subsequently as a minimum value BFMIN of the memberships of the color F in the color class BF.

Similarly, a minimum value SFMIN of the memberships in the color SF is defined as the lowest value of the memberships $ZSF_H$. $ZSF_B$, $ZSF_S$ The minimum value UBMIN of the memberships in the color class UB is defined as the lowest of the values of the memberships $ZUB_B$, $ZUB_S$ in the color class UB dependent on the brightness B and the saturation S.

Subsequently, a value L according to the relationship $$L = \text{MAX}(U\text{BMIN}, SF\text{MIN}, BF\text{MIN})$$

is formed for each picture element having the color F, where MAX denotes the selection of the highest value among the values UBMIN, BFMIN, SFMIN. Dependent on the value L, a minimum value SOMIN for the color class SO is defined:

$$SO\text{MIN1} = 1 - L.$$

The maximum value M is defined from these minimum values UBMIN, SFMIN, BFMIN, SOMIN according to the relationship $$M = \text{MAX}(U\text{BMIN}, SF\text{MIN}, BF\text{MIN}, SO\text{MIN})$$

A check is carried out in method step S26 to see whether the maximum value M of a picture element with the respective color F belongs to the color class BF. If not, then a check is carried out in Step S28 to see whether the maximum value M belongs to the color class SF. When this is also not the case, then a check is carried in the step S30 to see whether the maximum value M belongs to the color class UB.

When this is also not the case, the maximum value M of the respective color F of a picture element is assigned to the color class SO, and the color F has a scaled gray scale value GY assigned to it as follows:

$$GY = \text{MIN}(Y, 1 - SO\text{MIN}).$$

I.e., the color F is assigned either the scaled value Y of its brightness B as scaled gray scale value GY or, when the overall membership SOMIN in the color class SO is high and, thus, 1-SOMIN is low, it is given the value 1-SOMIN as a scaled gray scale value GY and, thus, a darker value. In step S34, the scaled gray scale value GY is multiplied by the maximum value BMAX of the brightness B. The result is allocated to every picture element having the same color F as a gray scale value GW having a length of 8 bits.

When it is found in Step S26 that a picture element having the respective color F is to be assigned to the color class BF, then the higher of the values Y and BFMIN is assigned to all picture elements having the color F as a scaled gray scale value GY in Step S36, where $$GY = \text{MAX}(Y, BF\text{MIN}).$$

Accordingly, colors of the color class BF receive the scaled value Y of their brightness B as a scaled gray scale value GY or they are brightened since these colors F of the color class BF are a matter of the colors F of the scatter information 18, 20 that are to be suppressed. Subsequently, the allocation of a gray scale value GW ensues to all picture elements having the same color F, as already described with reference to Step S34.

When, in Step S28, the color F is assigned to the color class SF, then the lower of the values Y and 1-SFMIN is allocate to it as scaled gray scale value GY in the Step S38.

$$GY = \text{MIN}(Y, 1 - SF\text{MIN})$$

Colors F of the color class SF receive the scaled value Y of their brightness B as gray scale value GY or they are darkened because of the colors F of the payload information 12, 14, 16 that are to be intensified. Step S34 follows again.

When it is recognized, in Step S32, that the respective color F belongs most strongly to the color class UB, then the scaled value Y of its brightness B is assigned to it as scaled gray scale value GY in the Step S40. The initially cited problems with picture elements that have colors F with a very high or very low brightness B or saturation S are avoided in that these colors F are assigned a scaled gray scale value GY regardless of their hue H. Method step S34 that has already been described then follows.

As an example, FIG. 5 shows a membership function $zUB_B$ in the color class UB depending on the brightness B, as can be employed in the method Step S12. The value of the brightness B is entered on the abscissa and the membership $ZUB_B$ in the color class UB is entered on the ordinate. The value $ZUB_B=0$ references the lowest membership, and the value $ZUB_B=1$ references the highest membership $ZUB_B$ in the color class UB. This definition of the membership applies to all following examples.

With the assistance of the membership function $zUB_B$ entered with a solid line, picture elements having very bright or very dark colors F have a high membership in the color class UB allocated to them. The triangular membership function $zUB_B$ has the membership $ZUB_B=1$ for the brightness B=0. Up to a value of the brightness UUB1, the membership $ZUB_B$ drops linearly to 0. Between values of the brightness UBB1 and UBB2, the membership $ZUB_B=0$ remains; the membership then rises between UBB2 and the highest value of the brightness B=1 linearly to $ZUB_B=1$. The membership function $zUB_B$ can be adapted to the respective requirements by the user.

As an example, a further, trapezoidal membership function $z=UB_B$ is entered in broken lines in FIG. 5 where the membership $ZUB_B$ is constant at the value $ZUB_B=1$ between the brightness B=0 and the brightness UBB3 and subsequently drops linearly to 0. The membership is $ZUB_B=0$ in a mid-range of the brightness B and increases linearly to a high brightness B up to $ZUB_B=1$ given a brightness UBB4. The membership $ZUB_B=1$ is constant between UBB4 and the maximum value of the brightness B=1. In another membership function $z\square UB_B$, which is shown with broken lines in FIG. 5, the drop of $ZUB_B=1$ to $ZUB_B=0$ and the rise from $ZUB_B=0$ to $ZUB_B=1$ does not ensue linearly, but rather takes the form of an S-curve.

Figure 6:
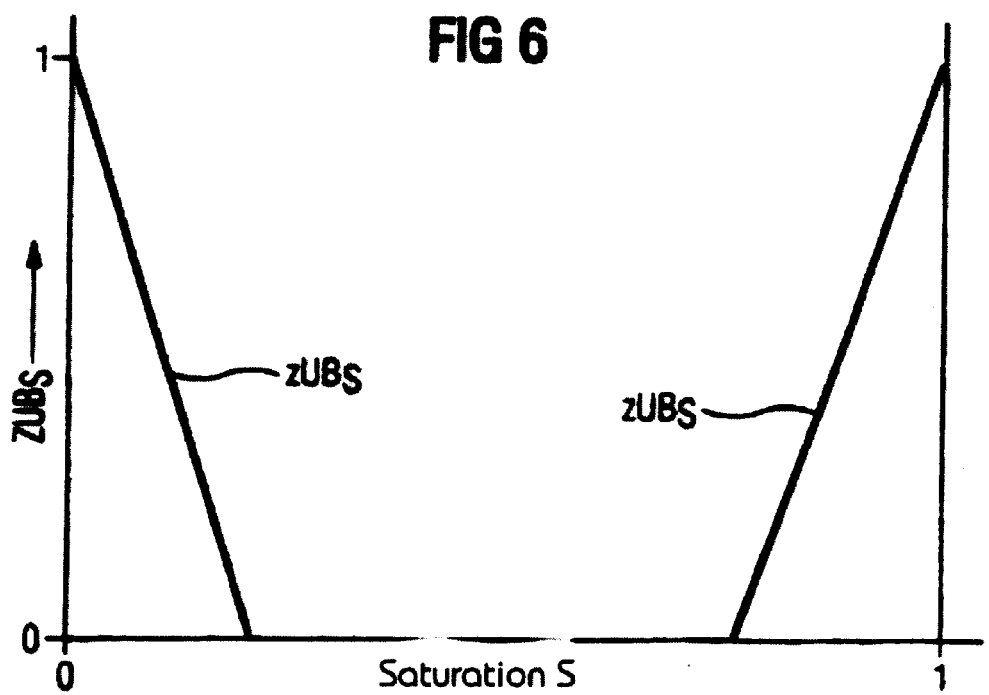
FIG. 6 is a graph illustrating the membership function in the color class UB as a function of the saturation.

FIG. 6 shows a similar curve by the membership function $zUB_S$ for the membership $ZUB_S$ in the color class UB as a function of the saturation S. Instead of the brightness B, the saturation S is entered on the abscissa and the membership $ZUB_S$ is entered on the ordinate. On the basis of the membership function $zUB_S$, picture elements having colors F with very low or with very high saturation S have a high membership $ZUB_S$ in the color class UB allocated to them. The membership function $zUB_S$ drops from a value of the membership $ZUB_S=1$ for a saturation S=0 linearly to $ZUB_S=0$ and retains the value $ZUB_S=0$ in a mid-range of the saturation S. Subsequently, $zUB_S$ rises linearly from $ZUB_S=0$ to $ZUB_S=1$ given a saturation S=1. Similar to FIG. 5, other curves of the membership function can also be employed here.

FIG. 7 shows a function $zSF_B$ of the membership $ZSF_B$ in the color class SF dependent on the brightness B. The membership $ZSF_B$ from 0 through 1 is entered on the ordinate and the brightness B is entered on the abscissa. The function $zSF_B$ has the membership $ZSF_B=1$ from the brightness B=0 up to a medium brightness B. Subsequently, the function $zSF_B$ drops linearly from $ZSF_B=1$ to $ZSF_B=0$ given a maximum brightness B=1. Colors F having high brightness B are given a low value $ZSF_B$ here, and colors F having low brightness B are given a high value $ZSF_B$. The curve of the function $zSF_B$ can be modified, similar to that stated above.

FIG. 8 shows an example of a membership function $zSF_S$ for the color class SF, where the saturation S is entered on the abscissa here and the membership $ZSF_S$ in the color class SF is entered on the ordinate. Colors F having a high value of the saturation S have a high membership $ZSF_S$ in the color class SF allocated to them here, whereas lightly saturated colors F are given a low value $ZSF_S$. The membership function $zSF_S$ rises linearly from $ZSF_S=0$ at the saturation S=0 to $ZSF_S=1$ for a medium saturation S and remains constant at $ZSF_S=1$ up to the highest saturation S=1. In this case, too, the curve of the membership $ZSF_S$ can be modified via the saturation S.

Figure 9:
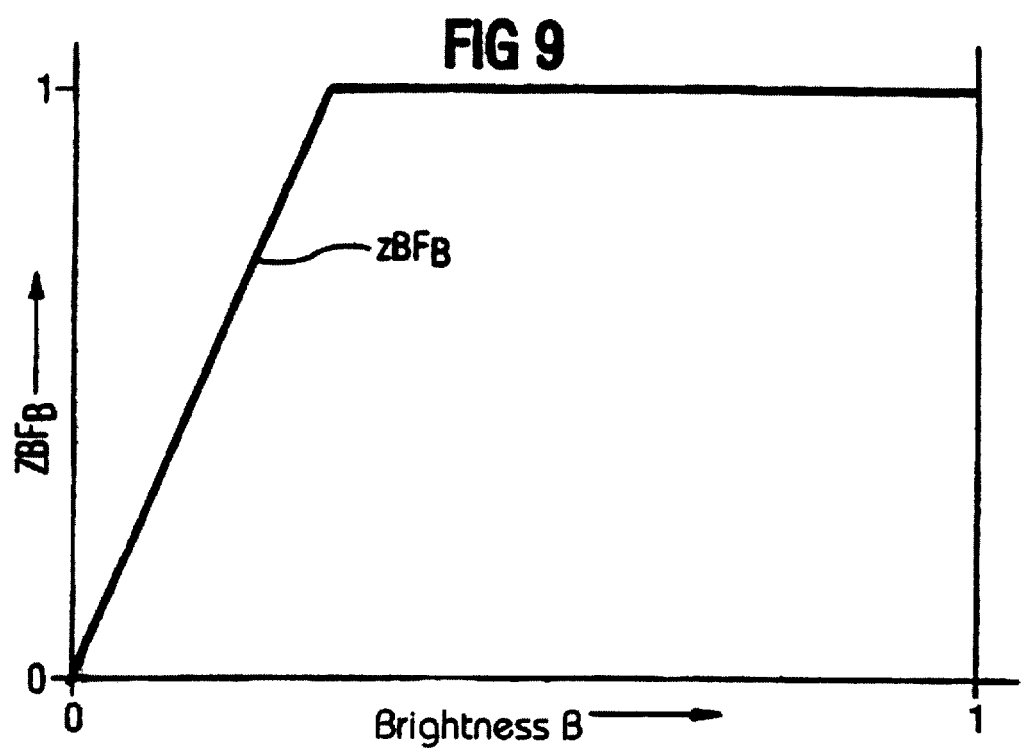
FIG. 9 is a graph illustrating the membership function in the color class BF as a function of brightness.

FIG. 9 shows the membership function $zBF_B$ for the color class BF dependent on the brightness B, which is entered on the abscissa. The membership $ZBF_B$ in the color class BF is entered on the ordinate. The membership function $ZBF_B$ has the value $ZBF_B=0$ for the brightness B=0 and rises linearly up to a medium value of the brightness B, namely to the value $ZBF_B=1$. The function $zBF_B$ remains at the value $ZBF_B=1$ up to the maximum brightness B=1. Accordingly, colors F and picture elements having such colors F that have a high brightness B are assigned a high membership $ZBF_B$ in the color class BF.

Figure 10:
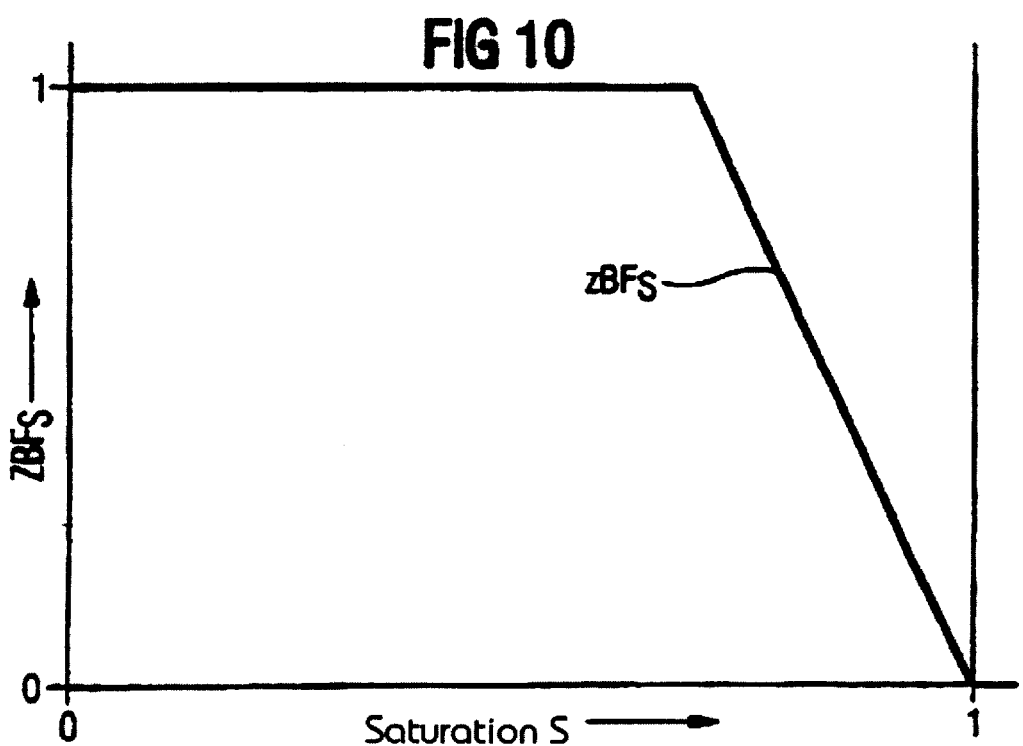
FIG. 10 is a graph of the membership in the color class BF as function of the saturation.

FIG. 10 shows the membership $ZBF_S$ in the color class BF as a function $zBF_S$ of the saturation S. The membership $ZBF_S$ is entered on the ordinate and the saturation S is entered on the abscissa. The function $zBF_S$ has the constant value $ZBF_S=1$ from S=0 up to a medium saturation S and drops linearly above this to S=1 at the value $ZBF_S=0$. This means that picture elements having colors with low saturation S have a high membership $ZBF_S$ in the color class BF allocated to them.

FIG. 11 shows an example of a frequency of occurrence analysis of the hues H of a form that ensued in step S16. The hue H is entered on the abscissa. The frequency of occurrence with which picture elements have the same value H is entered on the ordinate at the right side of the graphic. The frequency of occurrence of the picture elements having the same hue H of an analyzed form 10 is entered as a solid line as a histogram. The membership $ZSF_H$ in the color class SF is entered over the hue H at the left side on the ordinate. A membership function $zSF_H$ is entered with broken lines for a region BSF, this respectively allocating a membership $ZSF_H$ in the color class SF to the hues H within this region BSF. Outside this region BSF, the membership is $ZSF_H=0$. At least one such region BSF must be defined in step S18; however, there can also be two or more such regions. The curve of the respectively membership function $zSF_H$ can be modified; for example, it can be rectangular, trapezoidal, as in FIG. 11, or triangular.

FIG. 12 shows the distribution of the frequency of occurrence of picture elements having the same hue H from FIG. 11. The membership ZBFH in the color class BF dependent on hue H is entered of on the ordinate at the left side of the graphic. A membership function zBFH entered with broken lines assigns a membership ZBFH in the color class BF to hues H within a region BBF. Hues outside the region BBF have the membership ZBFH=0. A plurality of such regions BBF can be defined in the Step S18.

The above-described method and communication system are illustrative of the principles of the present invention. Numerous modifications and adaptations thereof will be readily apparent to those skilled in this art without departing from the spirit and scope of the present invention.

What is claimed is:

1. A method for processing image data, comprising the steps of:

scanning at least one section of a form raster-like;
converting said scanned form into a digital image comprising picture elements, a color of each and every picture element being presented according to the HSB color presentation at hue H, saturation S and brightness B;
determining, from a membership function zUBB via said brightness or from a membership zUBS via said saturation, in conformity with a fuzzy technique, memberships ZUBB and ZUBS of said color of each and every picture element in a first color class UB;
determining, from a membership function zSBB via said brightness B, a membership function zSFS via said saturation S, or from a membership function zSFH via said hue H, memberships ZSFB, ZSFS and ZSFH of said color of each and every picture element in a second color class SF;
determining, from a membership function zBFB via the brightness B, a membership function zBFS via the saturation S, or from a membership function zBFH via the hue H, memberships ZBFB, ZBFS an ZBFH of said color of each and every picture element in at least one third color class BF;
determining minimum values $UB$MIN=($ZUBB, ZUBS$), $SF$MIN=($ZSFB, ZSFS, ZSFH$), and $BF$MIN=($ZBFB, ZBFS, ZBFH$)

of said memberships ZUBB, ZUBS, ZSFB, ZSFS, ZSFH, ZBFB, ZBFS, ZBFH in respective color classes UB, SF, BF;
determining a maximum value M among said minimum values UBMIN, SFMIN, BFMIN;
allocating a respective color as well as picture elements belonging to this color to a color class UB, SF, BF that belongs to said maximum value M; and
allocating, depending on identified said color class UB, SF, BF, a gray scale value GW to a respective picture element.

2. The method according to claim 1, further comprising the steps of:
converting said value of the brightness B of a picture element into a scaled brightness Y with a value range 0 through 1; and
defining said gray scale value GW depending on said scaled brightness Y.

3. The method according to claim 2, wherein said scaled brightness Y is allocated to said respective picture element as a gray scale value GW when said maximum value M belongs to said first color class UB.

4. The method according to claim 2 wherein said gray scale value GW is allocated to said picture element according to the relationship $GW$=MIN ($Y$, 1-$SF$MIN)

when said maximum value M belongs to said second color class SF.

5. The method according to claim 2, characterized in that the gray scale value is allocated to the picture element according to the relationship $GW$=MAX ($Y$, $BF$MIN)

when the maximum value M belongs to the third color class BF.

6. The method according to claim 1, further comprising the steps of:
determining a value L for each picture element according to the relationship $L$=MAX($UB$MIN, $SF$MIN, $BF$MIN); and forming a value SOMIN according to the relationship $SO$MIN=1=$L$ where SOMIN is the membership of the picture element in a fourth color class SO.

7. The method according to claim 6, further comprising the step of allocating a minimum value from said scaled brightness Y and a value 1-SOMIN is allocated to a respective picture element of said fourth color class SO as a gray scale value GW according to the relationship $GW$=MIN($Y$, 1-$SO$MIN).

8. The method according to claim 6, wherein said fourth color class SO has colors F allocated to it that do not belong to any other color class UB, BF, SF.

9. The method according claim 1, wherein said membership function ZUBB or ZUBS for brightness value B or, respectively, saturation values S between a minimum value UBB1 and a maximum value UBB2 has the value 0.

10. The method according to claim 9, wherein said membership function zUBB or zUBS for low brightness values B and high brightness values B or, respectively, for low saturation values S and high saturation values S, has a rectangular, triangular, trapezoidal or an S-shaped curve in the fashion of a half-bell curve.

11. The method according to claim 1, further comprising the step of:
presenting a frequency of occurrence with which picture elements with specific hues H occur in at least one section of said form in the form of a frequency distribution over the hue H, said membership functions ZSFH, zBFH in regions with hues H from this frequency distribution having a rectangular, triangular, trapezoidal or an S-shaped curve in the fashion of a half-bell or a whole bell curve.

12. The method according to claim 1, wherein said membership functions zSFB, zSFS, zBFB, zBFS have a rectangular, triangular, trapezoidal or an S-shaped curve in the fashion of a half-bell or a whole-bell curve.

13. The method according to claim 1, wherein colors with which payload information are applied on said form are mainly allocated to said second color class SF.

14. The method according to claim 1, wherein colors F with which scatter information are applied on said form are mainly allocated to said third color class BF.

* * * * *